United States Patent [19]

Schaefer

[11] 4,403,813
[45] Sep. 13, 1983

[54] ROLLER BEARING CAGE DESIGN

[75] Inventor: James R. Schaefer, Juno Isles, Fla.

[73] Assignee: The United States of America as represented by the Secretary of the Air Force, Washington, D.C.

[21] Appl. No.: 311,379

[22] Filed: Oct. 14, 1981

[51] Int. Cl.³ .................................... F16C 33/46
[52] U.S. Cl. .......................... 308/207 R; 308/217
[58] Field of Search .......... 308/217, 218, 202, 207 R, 308/207 A, 208, 235

[56] References Cited

U.S. PATENT DOCUMENTS

| | | | |
|---|---|---|---|
| 726,914 | 5/1903 | Henderson | 308/217 X |
| 796,648 | 8/1905 | Hirth | 308/235 X |
| 967,934 | 8/1910 | Kirner | 308/217 X |
| 1,108,722 | 8/1914 | Dohner et al. | 308/217 |
| 1,438,654 | 12/1922 | Leon | 308/217 |
| 1,598,025 | 3/1924 | Stevens | 308/217 |
| 1,940,124 | 10/1930 | Gibbons | 308/217 |
| 2,227,064 | 12/1940 | Bryant | 308/217 |
| 2,418,322 | 4/1947 | Spicacci | 308/217 X |
| 2,711,938 | 12/1951 | Herrmann | 308/217 |
| 3,228,090 | 10/1964 | Schaeffler | 29/148.4 C |
| 3,365,775 | 1/1968 | Cavagnero et al. | 29/148.4 C |
| 3,963,285 | 6/1976 | Kellstrom | 308/217 X |
| 4,077,683 | 3/1978 | Bhateja et al. | 308/235 |

Primary Examiner—John M. Jillions
Assistant Examiner—David Werner
Attorney, Agent, or Firm—Donald J. Singer; Jacob N. Erlich

[57] ABSTRACT

A cage for a high speed anti-friction roller bearing having an improved design in which the openings therein have all four sides thereof formed of a convex configuration and join each other at concave corners of relatively large radii. By establishing an acceptable or initial roller skew angle based upon roller and guide rail design, the internal configuration of the cage is designed such that contact by the rollers at the corners of the cage will not occur until after wear between the rollers and the guide rails has developed to such an extent that the accptable skew angle of the rollers has been exceeded. Consequently, spalling or wear debris can be detected prior to roller-cage corner contact and probable catastrophic roller bearing failure can be prevented.

4 Claims, 4 Drawing Figures

ROLLER BEARING CAGE DESIGN

STATEMENT OF GOVERNMENT INTEREST

The invention described herein may be manufactured and used by or for the Government for governmental purposes without the payment of any royalty thereon.

BACKGROUND OF THE INVENTION

This invention relates generally to high speed anti-friction bearings, and, more particularly, to a novel design of an anti-friction roller bearing cage.

In general, an anti-friction bearing of the roller bearing type finds its greatest utility by being interposed between a stationary and a rotating member or two rotating members in order to substantially reduce the friction therebetween. Such a roller bearing generally comprises an inner ring and an outer ring, with the inner ring being fixedly secured to a rotating shaft. Situated between the inner ring and the outer ring are a plurality of cylindrical rollers. The rollers are generally held in a spaced apart relationship by a separator or retainer, more commonly referred to as a roller cage. As the shaft rotates, the inner ring rotates with respect to the outer ring, with the cage and rollers also rotating. As the speed of the shaft increases, the friction generated by the relative motion between the cage, rollers and rings increases.

The inner or outer ring of the roller bearing has shoulders or guide rails which axially contain therein the rollers in order to limit their degree of skew. The cage or separator which is utilized to separate the rollers reduces the rub velocity that would generally occur between the rollers without a separator or cage in place. It is therefore highly desirable to incorporate a cage within the roller bearing design since lower rub velocities generally result in less roller wear.

In the past conventional cages have been designed with square or rectangular pockets for positioning the rollers. With this type of cage design, roller wobble (skewing) results in impact of the roller and cage at or near the cage pocket corners. If the impact force of the roller against the cage is sufficient to cause cage fracture, a very rapid loss of rolling and/or centering capability of the bearing will result. Wobbling of the roller, also called skewing, is the amount a roller can turn within the constraints of the bearings shouldered ring while the angle of turn is called the roller skew angle.

If a roller bearing starts spalling on the raceways, the rollers will start to jump or bounce around and impact the cage near the corners. Also, if a roller bearing has one or more unstable or unbalanced rollers, the same end result will occur, and the cage will be continually impacted at the corners until the cross rails or side rails of the cage fracture or fall out. Generally the conventional cage design is such that stress concentrations occur near the cage pocket corners as a result of impact from the rollers. This is a major weakness which results in cage fracture of either the cross rails or side rails. Such cage fracture leads to rapid bearing deterioration.

It is therefore abundantly clear that as greater demand is placed upon high speed anti-friction bearings, it would be highly desirable to provide an anti-friction roller bearing which incorporates therein a roller bearing cage which aids in increasing the life expectancy of the anti-friction roller bearing. This can be accomplished if a roller bearing were designed which could provide sufficient time prior to loss of centering of the rollers so that inspection of the bearing could adequately take place.

SUMMARY OF THE INVENTION

The present invention overcomes the problems encountered in the past by designing an anti-friction roller bearing cage which substantially improves the overall reliability of the roller bearing. This is accomplished by a design of the cage which substantially increases the time between the start of a bearing problem and the point where the failure becomes catastrophic. This increased time allows for the detection of wear or spalling debris that is generated before loss of bearing roller centering occurs.

The anti-friction roller bearing cage of this invention is a substantially more durable cage than has been manufactured in the past. The cage design of this invention provides for a longer time interval between the initial bearing distress and the occurence or loss of roller centering. With this design criteria in mind, the cage of this invention incorporates therein corner radii which are of increased size from the corner radii of past cages and thereby reduces the stress concentration incurred therein. In addition, the normally rectangular cage pocket is replaced by a pocket having convex sides so that the roller will not impact near the corners.

In designing such a roller bearing cage it is first necessary to evaluate the acceptable amount of roller skew present in a good or new bearing. Further evaluation is then required to determine what increase in skew angle is permissible prior to roller-cage impact at the corners. The convex surfaces and corner radii of the cage pocket are then made such that contact by the rollers at the corners of the cage will not occur until wear of the roller ends and guide rails are sufficient to cause the roller to exceed the acceptable or originally designed skew angle.

It is therefore an object of this invention to provide an anti-friction roller bearing cage which incorporates therein large corner radii thereby substantially reducing stress concentrations at these locations.

It is a further object of this invention to provide an anti-friction roller bearing cage which incorporates therein convex surfaces within the cage pocket in order to maintain roller to cage contact of cross rails and side rails and away from the cage corners until a critical skew angle is reached.

It is a another object of this invention to provide an anti-friction roller bearing cage which is substantially more durable than such cages of the past.

It is a still further object of this invention to provide an anti-friction roller bearing cage which substantially increases the time required to fracture a cage side rail or cross rail by roller impact.

It is still another object of this invention to provide an anti-friction roller bearing cage which is economical to produce and which utilizes conventional, currently available components that lend themselves to standard mass producing manufacturing techniques.

For a better understanding of the present invention, together with other and further objects thereof, reference is made to the following description taken in conjunction with the accompanying drawing and its scope will be pointed out in the appended claims.

DETAILED DESCRIPTION OF THE DRAWING

DETAILED DESCRIPTION OF THE PREFERRED EMBODIMENT

Figure 1:
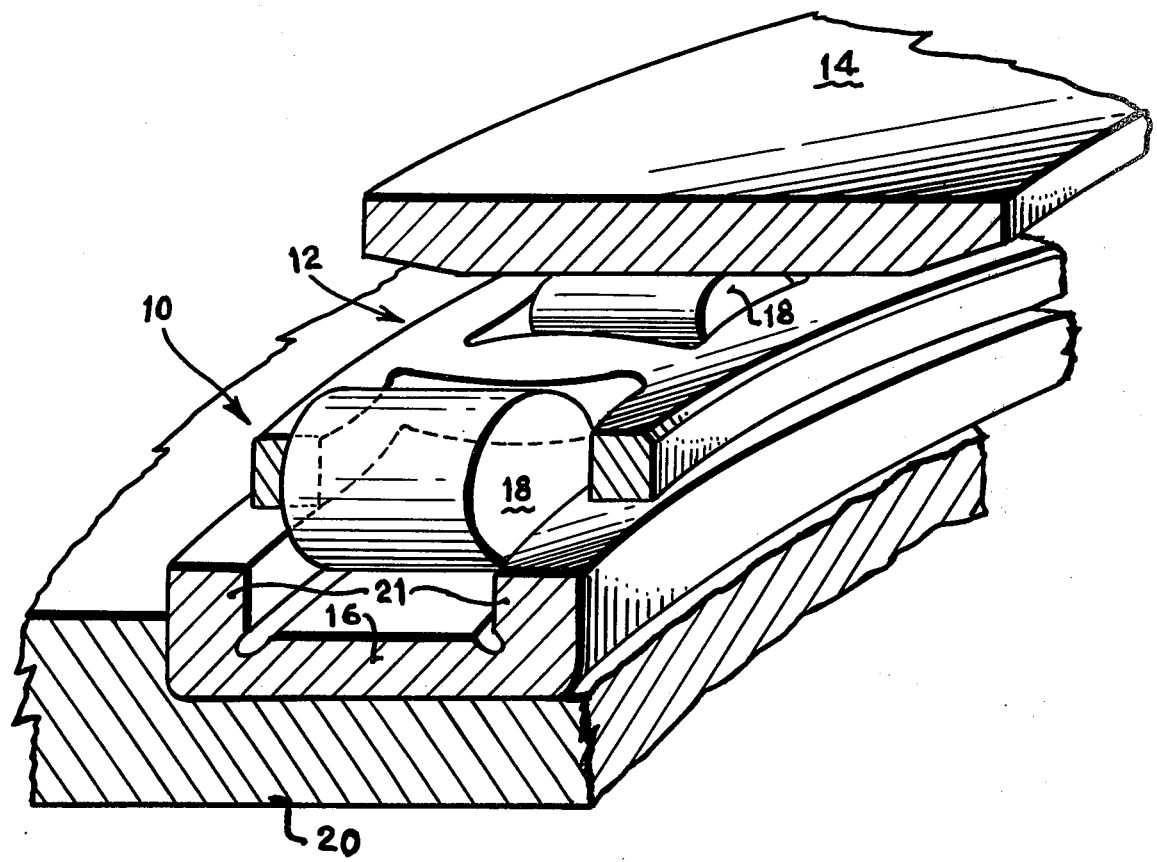
FIG. 1 is a pictorial representation of an anti-friction roller bearing incorporating therein the bearing cage of this invention and shown partly in cross-section and in segmented fashion.

Reference is now made to FIG. 1 of the drawing which illustrates in pictorial fashion an anti-friction roller bearing 10 which incorporates therein the roller bearing cage 12 of the present invention. Roller bearing 10 is made up of an annular outer ring 14, an inner ring 16 and a plurality of rollers 18 held in place by the cage 12 of this invention. Outer ring 14 may be either stationary or rotatable while inner ring 16, which is also preferably of an annular configuration is fixedly secured upon a rotatable shaft 20 so as to be rotatable therewith. As illustrated in FIG. 1, the plurality of spaced-apart, cylindrical rollers 18 are interposed between the shoulders or guide rails 21 of inner ring 16 and outer ring 14. Rollers 18 are held in spaced-apart relation with respect to one another by the cage 12 of this invention which fits upon the plurality of rollers 18. The details of cage 12 will be set forth hereinbelow with reference to FIGS. 3 and 4 of the drawing.

Figure 2:
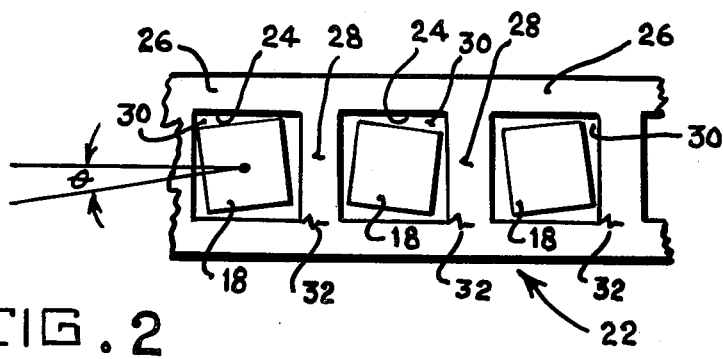
FIG. 2 is a plan view of a roller bearing cage utilized in the prior art and shown in segmented fashion.

In order to better understand the effectiveness of cage 12 of this invention it is first necessary to illustrate a typical prior art cage 22 shown in FIG. 2 of the drawing. In general, cages or separators 22 used for the purpose of maintaining the cylindrical rollers 18 of an anti-friction bearing in spaced-apart relationship were configured so as to encase rollers 18 within a substantially square or rectangular cage pocket 24. The top view of cage 22 illustrated in FIG. 2 of the drawing shows cylindrical rollers 18 within the cage pocket 24 at various skew angles $\theta$ with respect to the cage side rails 26 and cross rails 28.

In such a design as illustrated in FIG. 2 the roller skew or wobble causes impact to occur adjacent the cage pocket corners 30 resulting in fatigue cracks illustrated by numeral 32 to form at the corners 30. As a result thereof the cross rails 28 and/or side rails 26 of cage 22 will eventually break out completely. This condition occurs rapidly if a roller 18 has a large unbalance or the raceways are spalling. Under the above conitions increased roller to cage contact results.

Figure 3:
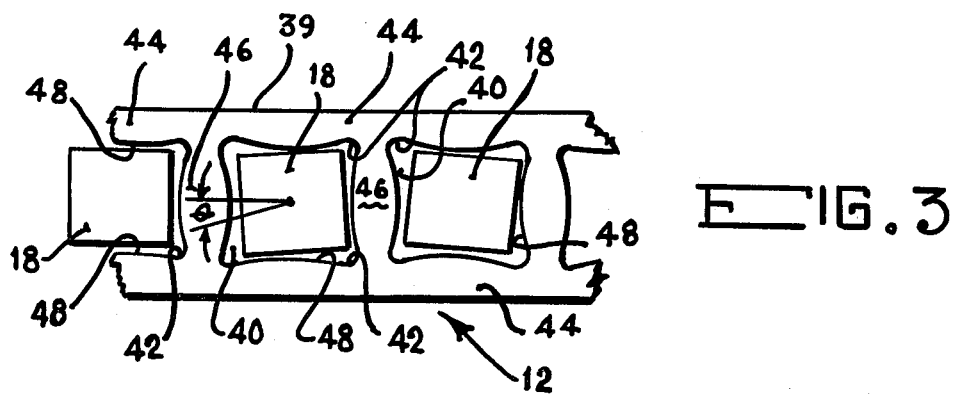
FIG. 3 is a plan view of the roller bearing cage of this invention shown in segmented fashion.
Figure 4:
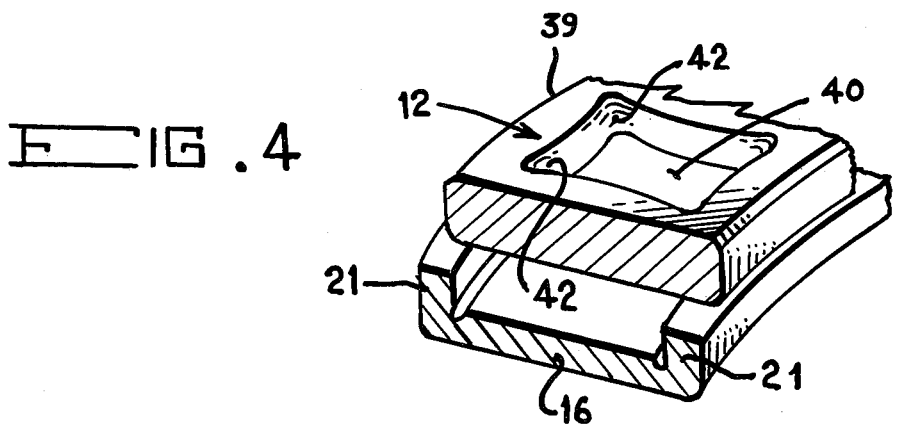
FIG. 4 is a pictorial representation of a portion of the roller bearing cage of this invention shown in segmented fashion and without the rollers in place.

In order to overcome the problems of the prior art, cage 12 of this invention, and as more clearly illustrated in FIGS. 3 and 4 of the drawing, has been designed. In this invention cage 12 is made of an annular-shaped element 39 having a plurality of cage pocket 40 therein, each pocket 40 being designed of a novel configuration. For example, the corner radius 42 of each cage pocket 40 is substantially increased in concavity over the radii of corners in past cage structures. In addition, the side rails 44 and cross rails 46 are made of a convex shape 48. The combined configuration yielding a cloverleaf-like design.

More specifically, in order to determine the size of the radius of each corner 42 and the degree of curvature of the convex configuration 48 of side rails 44 and cross rails 46, one must first evaluate or determine the amount of roller skew angle $\theta$ which is acceptable in a good or new bearing. This initial or acceptable skew angle $\theta$ is controlled by the geometry of the roller 18 and shoulders or guide rails 21 of inner ring 16. Thereafter, evaluation is made to determine the increase in skew angle $\theta$ that can be allowed before roller cage impact at the corners of cage 12 occur.

The convex configuration 48 as well as the size of the corner radii 42 are designed such that contact at corners 42 of cage 12 by rollers 18 will not occur until after wear of the roller ends and guide rails 21 have developed to such an extent that the original acceptable skew angle $\theta$ has been exceeded by a predetermined amount, this predetermined amount being sufficient to produce detectable spalling or wear debris. More succinctly, the convex shape 48 of side rails 44 and cross rails 46 and increased radii 42 are designed so as to prevent contact of the bearing corners 42 at or slightly greater than the original skew angle $\theta$.

With the above inventive cage design, the corners 42 of cage 12 will not be impacted until a predetermined time after roller and guide rail wear occurs. Consequently, cage 12 insures a longer time interval between initial bearing distress and loss of roller centering. The increased radii 42 reduces stress concentration while the convex configuration 48 of rails 44 and 46 prevents roller 18 from impacting near the corners 42.

Since it is physically impossible to prevent all bearing wear from occuring it is not the object of this invention to totally eliminate roller wear, but rather to increase the time between the start of a bearing problem and the point where failure of the bearing becomes catastrophic. The design of cage 12 allows additional time in order to detect wear or spalling debris that is generated prior to the loss of centering of rollers 18 and the bearing is no longer operable. Consequently, the more durable cage 12 of this invention has greatly improved the reliability of high speed anti-friction bearings.

Although this invention has been described with reference to a particular embodiment, it will be understood that this invention is also capable of further and other embodiments within the spirit and scope of the appended claims.

I claim:

1. A cage for use with a high speed anti-friction roller bearing having a plurality of rollers mounted within guide rails, said cage comprising an annular-shaped element, said element having a plurality of spaced apart openings therein, each of said openings being defined by a pair of side rails and a pair of cross rails, each of said side rails and said cross rails being of a convex configuration facing the interior of said opening, said convex configuration having a curvature of predetermined size, said predetermined size of curvature of said convex configuration being such as to allow said rollers to move from an acceptable initial skew angle determined by said guide rails to another skew angle at which spalling or wear debris from said rollers and said guide rails occurs and said side rails and said cross rails joining each other to form four concave corners, each of said concave corners being of a radius of predetermined size, whereby upon utilization of said cage in conjunction with said plurality or rollers within said bearing, contact by said rollers at said corners of said cage will not occur during initial bearing operation.

2. In a high speed anti-friction roller bearing having an outer ring, an inner ring having a pair of spaced apart guide rails, a plurality of rollers interposed between said outer ring and said inner ring and positioned between said guide rails, each of said rollers having an acceptable initial skew angle determined by said roller and said guide rail geometry, the improvement therein being in the form of a roller cage interposed between said outer ring and said inner ring and encompasing said rollers, said cage comprising an annular-shaped element, said element having a plurality of spaced apart openings therein, each of said openings being defined by a pair of side rails and a pair of cross rails, each of said rollers being positioned within a separate one of said openings, respectively, each of said side rails and said cross rails being of a convex configuration adjacent said rollers, said convex configuration having a curvature of predetermined size, and said side rails and said cross rails joining each other to form four concave corners, each of said concave corners being of a radius of predetermined size, said predetermined size of said curvature of said convex side rails and said cross rails and said predetermined size of said radius of each of said corners being established such that contact by said rollers at said corners of said cage will not occur until after wear between said rollers and said guide rails has developed to such an extent that said acceptable initial skew angle of said rollers is exceeded.

3. In a high speed anti-friction roller bearing as defined in claim 2 wherein each of said openings of said cage form a cloverleaf-like design.

4. A method of preventing catastrophic failure of an anti-friction roller bearing comprising the following steps:
 (a) rotatably supporting a plurality of rollers within guide rails of an inner ring of said bearing;
 (b) designing said rollers and said guide rails so as to produce an acceptable roller skew angle;
 (c) separating said rollers from each other by a cage;
 (d) designing said cage with a plurality of openings therein, each of said openings being defined by a pair of side rails and a pair of cross rails, and each of said rollers being positioned in each of said openings, respectively;
 (e) configuring the interior of each of said openings so that said side rails and said cross rails are of a convex configuration having a curvature of predetermined size, said side rails and said cross rails joining each other at four concave corners, each of said corners having a radius of predetermined size;
 (f) establishing said size of said curvature of said convex side rails and cross rails and said size of said radius of each of said corners such that contact by said rollers at said corners of said cage will not occur until after wear between said rollers and said guide rails has developed to such an extent that said acceptable initial skew angle of said rollers is exceeded and spalling or wear debris from said rollers and said guide rails occurs; and
 (g) detecting said spalling or wear debris in order to cease roller bearing operation prior to occurrence of said catastrophic roller bearing failure.

* * * * *